(12) United States Patent
Paetz et al.

(10) Patent No.: US 6,942,288 B2
(45) Date of Patent: Sep. 13, 2005

(54) GLASS COVER FOR A VEHICLE ROOF AND PRODUCTION METHOD THEREFOR

(75) Inventors: Werner Paetz, Hofstetten (DE); Sven Vilsmayer, Kraillinger (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 43 days.

(21) Appl. No.: 10/485,711
(22) PCT Filed: Oct. 18, 2002
(86) PCT No.: PCT/EP02/11654
§ 371 (c)(1), (2), (4) Date: Feb. 4, 2004
(87) PCT Pub. No.: WO03/041980
PCT Pub. Date: May 22, 2003

(65) Prior Publication Data
US 2004/0183342 A1 Sep. 23, 2004

(30) Foreign Application Priority Data
Oct. 19, 2001 (DE) .................................. 101 51 156

(51) Int. Cl.⁷ ................................................. B60J 10/12
(52) U.S. Cl. ................................ 296/216.09; 296/211
(58) Field of Search ....................... 296/211, 216.09, 296/215

(56) References Cited

U.S. PATENT DOCUMENTS

| | | | | | |
|---|---|---|---|---|---|
| 4,455,338 | A | * | 6/1984 | Henne | 428/137 |
| 4,509,791 | A | * | 4/1985 | Bienert et al. | 296/216.09 |
| 4,914,883 | A | * | 4/1990 | Wencley | 52/309.5 |
| 6,034,320 | A | * | 3/2000 | Malcherczyk et al. | 136/251 |

* cited by examiner

Primary Examiner—Dennis H. Pedder
(74) Attorney, Agent, or Firm—Nixon Peabody LLP; David S. Safran

(57) ABSTRACT

A glass cover (10) for a vehicle roof, having an at least partially transparent pane (14) of safety glass and optionally a support arrangement (18), which is mounted on the lower side of the pane in the pane edge area by means of a foam block (16) provided there. The lower side of the pane (14) is provided with a transparent composite film (26) having an adhesive film (28) and a tear- and scratch-resistant shatterproof film (30) as well as optionally embedded solar cell (62). The shatterproof film (30) is affixed on the center area of the lower side of the pane by means of the adhesive film (28), the film being incorporated into the foam block (16).

16 Claims, 1 Drawing Sheet

GLASS COVER FOR A VEHICLE ROOF AND PRODUCTION METHOD THEREFOR

BACKGROUND OF THE INVENTION

1. Field of the Invention

This invention relates to a glass cover for a motor vehicle roof with a pane of safety glass which is at least partially transparent, a carrier arrangement which is attached to the bottom of the pane in the edge area of the pane by means of peripheral foaming, a transparent film composite which is located on the bottom of the pane and is formed of an adhesive film and a tear-resistant and scratch-resistant fragment protective film, the protective film being cemented to the central area of the bottom of the pane by means of the adhesive film, and the edge area of the pane being enclosed in a peripheral foam, and a process for producing the same.

2. Description of Related Art

A glass cover of the above mentioned type which is additionally provided with solar cells is known, for example, from published German Patent Application DE 43 23 140 A1. A cover on the bottom is foamed into an enclosing frame with a very narrow edge area so that when the glass pane breaks the cover with the glass fragments can fall into the vehicle interior.

SUMMARY OF THE INVENTION

The object of this invention is to devise a glass cover, with or without a solar function, for a motor vehicle roof which offers protection to the passengers and to the vehicle interior that is as good as possible when the glass cover breaks and is still easy to produce. Furthermore, the invention also seeks to provide a corresponding production process.

This object is achieved in accordance with the invention by a glass cover of the initially mentioned type in which the film composite, in the edge area, is provided with perforations for passage of the foaming mass, and by a corresponding process in which a transparent film composite which has an adhesive film and a tear-resistant and scratch-resistant fragment protective film being affixed in the central area on the bottom of an at least partially transparent pane of safety glass by means of the adhesive film, the edge area which has a tear-resistant and scratch-resistant fragment protective film, but no adhesive film, is embedded into peripheral foam which is applied to the bottom of the bottom of the pane in its edge area, and the adhesive film-free edge area of the film composite is anchored by means of the perforations provided there for passage of the peripheral foaming mass in the peripheral foam.

In these approaches according to the invention, it is advantageous that, when the glass pane breaks, on the one hand, the fragments of the broken glass pane remain suspended on the protective film composite, and on the other hand, that the protective film composite is securely joined to the carrier arrangement in the edge area, the protective film composite no longer being flexurally stiff, but like a collecting net which is securely clamped on the edges, being held in place in the cover. In this way, the glass fragments can be prevented from reaching the vehicle interior, passengers can be prevented from being thrown through the broken glass to the outside, articles from the outside can be prevented from being able to penetrate through the broken pane into the interior or the interior is prevented from being freely accessible when the glass pane is destroyed in case of a burglary.

The invention is explained in detail below, by way of example, with reference to the accompanying drawings.

DETAILED DESCRIPTION OF THE INVENTION

Figure 1:
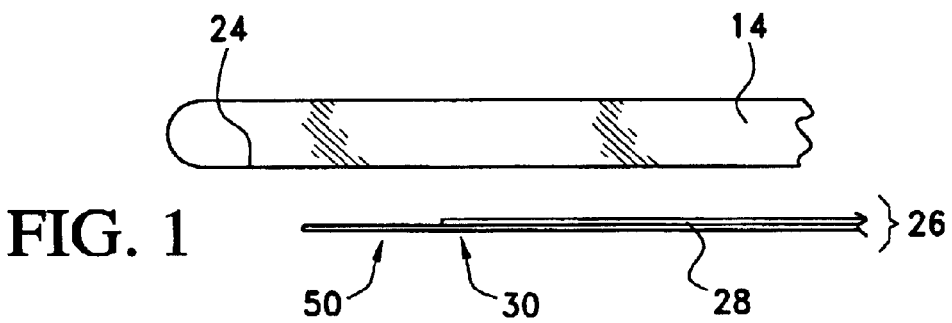
FIG. 1 is a sectional view through a side edge area of a glass cover in accordance with the invention.

FIG. 1 shows a first embodiment of the glass cover 10 which is designed for closing or selectively clearing an opening in a fixed roof skin. It can be, for example, the cover of a sliding roof, sliding and lifting roof, raising roof or spoiler roof or also a fixed roof window. The glass cover 10 comprises a transparent glass pane 14 which is provided with peripheral foam 16 (for example, polyurethane foam) in its edge area, by means of which, preferably, a carrier arrangement 18 made, for example, as an inside cover sheet is attached in the edge area of the pane 14 to its bottom. The inside cover sheet 18 is used as a carrier arrangement for the glass pane 14 in order to join it to an displacement mechanism (not shown) for the cover 10, which can be of any conventional design. On the outer periphery of the foam 16, there is a seal 20 to prevent penetration of moisture into the vehicle interior 22 when the cover 10 is closed. Furthermore, in the edge area of the pane 14, on the bottom in the area of the foam 16 or of the inside cover sheet 18, there is a glass filter in the form of printing which is used as nontransparent visual protection to cover the peripheral foam 16 and the inside cover sheet 18 from above.

The glass pane 14 is preferably made from thermally prestressed single-pane safety glass.

In its central, transparent area, the bottom of the pane 14 is laminated or cemented to a film composite 26, this central area extending as far as the inner edge of the glass filter 24. The film composite 26 is provided on its top, i.e., on the side facing the pane 14, with an adhesive film or an adhesive layer 28 which is used to affix the underlying protective film 30 to the pane 14 in its central area. The protective film 30 is made to be tear-resistant and scratch-resistant. The film composite 26, with respect to its base surface, is smaller than the glass pane 14, but larger than its central transparent area.

The inside cover sheet 18 is attached to the glass pane 14 by means of the peripheral foam 16 in which they are embedded. In doing so, the edge area 50 of the film composite 26 which is provided with numerous perforations 52 is embedded into the peripheral foam 16 at the same time. The foam mass passes through the perforations 52, and thus, nondetachably embeds the film composite 26 into the peripheral foam 16 by form-fit. Between the edge area 50 and the area of the film composite 26 which is affixed to the central area of the pane 14, there is preferably a tension relief fold 42 which, among other things, prevents the cement connection of the film composite 26 in the central area of the glass pane 14 from being exposed to a tensile load by the attachment of the edge area 50 to the peripheral foam 16 when the cover 10 is, for example, elastically deformed by the forces which occur in high speed driving. In this way, the service life of the cover 10 can be increased.

Prior fixing or additional fixing of the edge area of the film composite 26 to the inside cover sheet 18 can take place by means of a screw connection or in some other mechanical way, for example, by means of a clamp connection.

The described construction is used to ensure that, even when the glass pane 14 breaks, a certain mechanical integrity of the cover 10 is maintained by the film composite 26, even with the pane 14 broken, remaining clamped in its edge area 50 to the cover frame which is formed by the peripheral foam 16 and the inside cover sheet 18, which are also preserved with the glass pane broken. In doing so, the film composite 26 loses its flexural stiffness, but maintains the cover 10 in place and thus can prevent, on the one hand, passengers from being thrown to the outside through the broken pane 14, and on the other, fragments of the pane 14 or articles being able to penetrate from the outside into the interior 22. Furthermore, the film composite 26 provides for a certain burglary protection in the case of intentional destruction of the glass pane 14. The fragments of the broken glass pane 14 remain suspended on the film composite 26 as a result of the adhesive action of the adhesive film 28.

Figure 2:
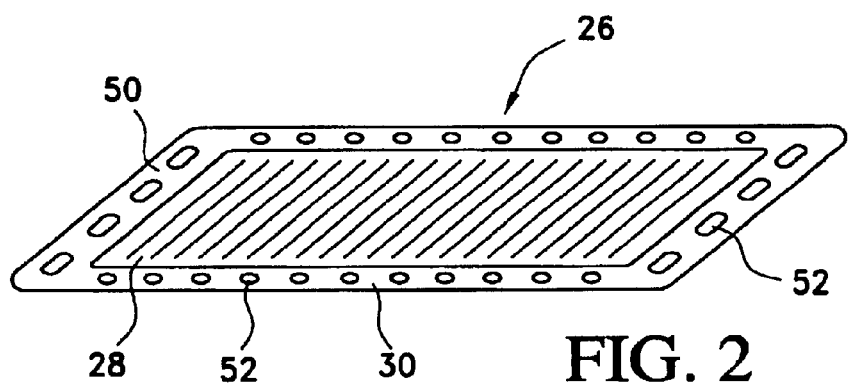
FIG. 2 is a perspective view of the film composite which is used in the manufacture of the cover.

As shown in FIG. 2, the adhesive film-free edge area 50 is provided with perforations or openings 52 which are distributed essentially regularly over the edge area 50.

Figure 3:
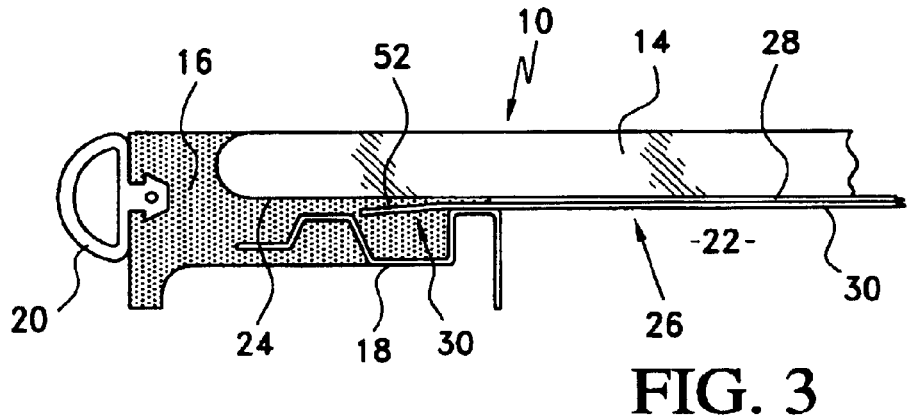
FIG. 3 shows a section similar to FIG. 1 before cementing the film composite on and peripheral foaming.

Proceeding from the state which is shown in FIG. 3, first the film composite 26 is affixed to the bottom of the pane in the central area of the glass pane 14 by means of the adhesive layer 28. The edge area 50 of the film that is free of adhesive is therefore not joined to the glass pane 14. Then, the glass pane 14 which is affixed to the film composite 26, in this way, is placed in a conventional foaming tool and a suitable material, for example polyurethane, foamed about the edge area in order to attach the inside cover sheet 18 to the glass pane 14, the foam material travelling through the perforations 52 so as to, in this way, anchor the protective film 30 in the peripheral foam 16. In doing so, the anchoring of the protective film 30 can be additionally reinforced by mechanical attachment of the edge area 50 of the film composite 26 on the inside cover sheet 18.

The adhesive film is preferably a polyvinylbutyral film (PVB film) or a transparent polyurethane film (PU film), while the protective film 30 is preferably a plastic film which is coated to be scratch-proof, preferably a polyethylene terephthalate film (PET film) which is coated with polysiloxane.

Figure 4:
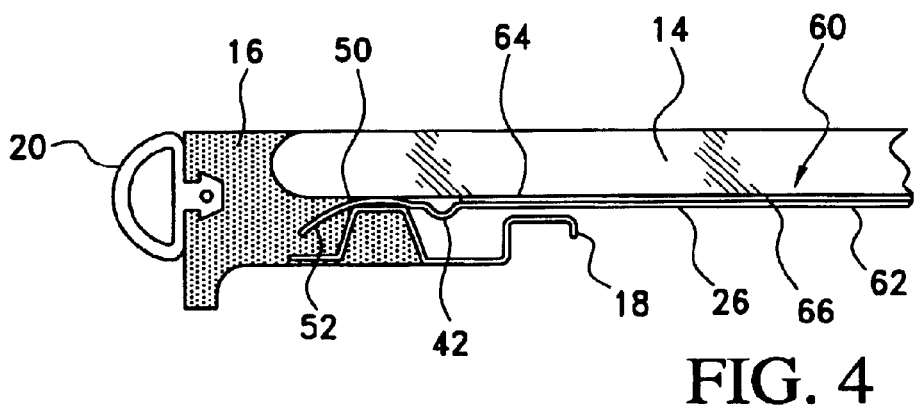
FIG. 4 is a view similar to FIG. 1, but showing an embodiment of a glass cover provided with solar cells.

FIG. 4 shows an embodiment in which the above described safety concept is applied to a solar cover, the bottom of the glass pane 14 being provided with a solar cell film composite 60 which has a plurality of solar cells 62 that are electrically interconnected and which are located between two hot-melt adhesive films 64, 66, which are made, preferably, of ethylene-vinyl acetate copolymer (EVA). The solar cell film composite 60 is attached to the bottom of the glass pane 14 by means of the upper hot-melt adhesive film 64. The protective film composite 26 is attached by means of the adhesive film 28 to the solar cell film composite 60 on the bottom hot-melt adhesive film 66, and thus, to the glass pane 14.

In the edge area 50 which is free of the adhesive film, the protective film composite 26 is anchored as in the embodiment shown in FIGS. 1 to 3, by means of the perforations 52 in the peripheral foam 16. Between the area which is anchored in the peripheral foam 16 and the area of the protective film composite 26 which is affixed to the solar cell film composite 60, there is a relief fold 42 to prevent delamination with the pane 14 intact as a result of tensile loading of the adhesive connection between the protective film composite 26 and the solar cell film composite 60 which could occur as a result of the anchoring of the area 50 of the protective film composite 26 in the peripheral foam 16.

When the glass pane 14 breaks, the protective film composite 26 which is anchored in the peripheral foam 16 prevents fragments of the pane and the solar cell film composite 60 from falling in or out, and thus, protects especially the vehicle interior and the vehicle passengers.

In one modified embodiment, the lower hot-melt adhesive film 66 of the solar cell film composite 60 can be omitted so that the adhesive film 28 of the protective film composite 26 is cemented directly to the solar cells 62 or the upper hot-melt adhesive film 64 of the solar cell film composite 60.

What is claimed is:

1. Glass cover for a motor vehicle roof, comprising:
   a pane of safety glass which is at least partially transparent,
   a carrier arrangement which is attached to the bottom of the pane in an edge area of the pane by a peripheral frame of a foam material,
   a transparent film composite which is located on the bottom of the pane,
   wherein the transparent film composite comprises an adhesive film and a tear-resistant and scratch-resistant fragment protective film,
   wherein the fragment protective film is adhered to the bottom of the pane by the adhesive film in a central area of the pane (14) and
   wherein the edge area of the pane is embedded in the peripheral frame of foam material,
   wherein the edge area of the film composite is provided with perforations (52) for passage of the foam material.

2. Glass cover as claimed in claim 1, wherein the edge area of the film composite is attached free of tensile stress with respect to the area affixed to the pane by a relief fold provided between the area affixed to the pane and the edge area.

3. Glass cover as claimed in claim 2, wherein the glass pane has a nontransparent printed glass filter in its edge area and wherein the peripheral foam, the carrier arrangement and the edge area of the film composite are located underneath the edge area.

4. Glass cover as claimed in claim 1, wherein the edge area of the film composite is free of said adhesive film.

5. Glass cover as claimed in claim 1, wherein the adhesive film is a polyvinylbutyral film or a polyurethane film.

6. Glass cover as claimed in claim 1, wherein the fragment protective film is a plastic film which is coated with a scratch-proof enamel.

7. Glass cover as claimed in claim 6, wherein the fragment protective film is a polyethylene terephthalate film.

8. Glass cover as claimed in claim 7, wherein the fragment protective film is coated with polysiloxane.

9. Glass cover as claimed in claim 1, wherein the carrier arrangement is an inside cover sheet.

10. Glass cover as claimed in claim 1, wherein the film composite is attached to the carrier arrangement.

11. Glass cover as claimed in claim 1, wherein the pane is made of single-pane safety glass.

12. Glass cover as claimed in claim 1, wherein at least one solar cell is integrated into the film composite.

13. Glass cover as claimed in claim 12, wherein the solar cells are embedded in the film composite in at least one hot-melt adhesive film.

14. Process for producing a glass cover for a motor vehicle roof, comprising the following process steps:

adhering a transparent film composite, which has an adhesive film and a tear-resistant and scratch-resistant fragment protective film, in a central area on the bottom of an at least partially transparent pane of safety glass by means of the adhesive film, embedding the edge area, which has the tear-resistant and scratch-resistant fragment protective film but is free of the adhesive film, into a peripheral frame of foam material by applying the foam material to the bottom of the bottom of the pane in its edge area, anchoring the edge area of the film composite that is free of the adhesive film in the foam material of the frame by means of perforations provided for passage of the foam material and through which the foam material is caused to pass.

15. Process as claimed in claim 14, wherein, in addition, a carrier arrangement for the pane is embedded in the peripheral foam and the film composite is fixed on it before the applying of the foam material.

16. Process as claimed in claim 15, comprising the further step of integrating at least one solar cell into the film composite.

* * * * *